United States Patent [19]

Kuo et al.

[11] Patent Number: 5,204,304
[45] Date of Patent: Apr. 20, 1993

[54] VANADIUM-CONTAINING POLYMERIZATION CATALYST

[75] Inventors: Chi-I Kuo, Humble, Tex.; Michael W. Lynch, Schaumburg, Ill.

[73] Assignee: Quantum Chemical Corporation, New York, N.Y.

[21] Appl. No.: 710,263

[22] Filed: Jun. 4, 1991

[51] Int. Cl.$^5$ .................................................. C08F 4/68
[52] U.S. Cl. .................................... 502/116; 502/114; 502/115; 502/119; 502/120; 502/128; 502/129; 502/132; 502/103; 502/129
[58] Field of Search ............... 502/103, 114, 115, 116, 502/119, 120, 128, 129, 132

[56] References Cited

U.S. PATENT DOCUMENTS

| | | | |
|---|---|---|---|
| 2,919,265 | 12/1959 | Brooks | 260/93.7 |
| 3,029,231 | 4/1962 | van Amerongen | 260/87.5 |
| 3,030,350 | 4/1962 | de Jong et al. | 260/94.9 |
| 3,051,690 | 8/1962 | Vandenberg | 260/88.2 |
| 3,058,963 | 10/1962 | Vandenberg | 260/88.2 |
| 3,144,473 | 8/1964 | Boor, Jr. et al. | 260/429.9 |
| 3,168,484 | 2/1965 | Engel et al. | 252/429 |
| 3,218,266 | 11/1965 | Ludlum | 502/113 |
| 3,231,515 | 1/1966 | Ziegler et al. | 252/429 |
| 3,240,773 | 3/1966 | Boor, Jr. | 260/93.7 |
| 3,260,708 | 7/1966 | Natta et al. | 260/79.5 |
| 3,345,351 | 10/1967 | McCall et al. | 260/93.7 |
| 3,371,079 | 2/1968 | Peters et al. | 260/94.9 |
| 3,392,162 | 7/1968 | Ziegler et al. | 260/94.9 |
| 3,394,118 | 7/1968 | Boor, Jr. | 260/93.7 |
| 3,457,244 | 7/1969 | Fukuda et al. | 260/80.78 |
| 3,535,269 | 10/1970 | Tanaka et al. | 252/429 |
| 3,655,583 | 4/1972 | Yamamoto et al. | 252/431 |
| 3,786,032 | 1/1974 | Jennings et al. | 502/127 X |
| 3,899,477 | 8/1975 | Altemore et al. | 502/113 X |
| 4,008,358 | 2/1977 | Abe et al. | 502/113 X |
| 4,063,009 | 12/1977 | Ziegler et al. | 526/159 |
| 4,202,958 | 5/1980 | Yamaguchi et al. | 526/142 |
| 4,256,865 | 3/1981 | Hyde et al. | 526/124 |

(List continued on next page.)

FOREIGN PATENT DOCUMENTS

| | | |
|---|---|---|
| 0314165 | 5/1989 | European Pat. Off. |
| 0324586 | 7/1989 | European Pat. Off. |
| WO89/01497 | 2/1989 | PCT Int'l Appl. |
| 785314 | 10/1957 | United Kingdom . |
| 828201 | 2/1960 | United Kingdom . |
| 1175593 | 12/1969 | United Kingdom . |
| 1489410 | 10/1977 | United Kingdom . |

OTHER PUBLICATIONS

Karol, et al., "Developments with High-Activity Titanium, Vanadium and Chromium Catalyst in Ethylene Polymerization", *Transition Metal and Organometallics as Catalysts for Olefin Polymerization*, Kaminsky and Sinn (Eds.), pp. 149–161.

Smith, et al., "Bimetallic Hlaides Crystal Structure of and Ethylene Polymerization by VCl$_2$.4THF", *Inorg. Chem.*, 24, pp. 2997–3002 (1985).

Karol, et al., "Ethylene Polymerizatin with High Activity Titanium, Vanadium and Chromium Catalysts", *Book of Abstracts, 193rd ACS National Meeting, Denver, Colo.*, Apr. 5–10, 1987.

Primary Examiner—Patrick P. Garvin
Attorney, Agent, or Firm—Kenneth D. Tremain; Richard G. Jackson

[57] ABSTRACT

A vanadium-containing catalyst is prepared as the product of admixing an inorganic oxide, inorganic phosphate or mixtures thereof, a zinc-containing composition, and a vanadium-containing composition. An auxiliary compound such as, for example, an aluminum halide compound may optionally be admixed. The catalyst may be combined with a co-catalyst such as an aluminum alkyl and, optionally, a halocarbon promotor to yield an olefin polymerization catalyst system. The resulting catalyst system exhibits high activity, excellent hydrogen response and produces a polymer having a narrow to broad molecular weight distribution with a bimodal profile. The catalyst is especially useful in ethylene homopolymerization and co-polymerization.

41 Claims, 1 Drawing Sheet

U.S. PATENT DOCUMENTS

| | | | |
|---|---|---|---|
| 4,381,253 | 4/1983 | Shipley | 252/431 C |
| 4,397,761 | 8/1983 | McDaniel et al. | 502/120 X |
| 4,426,317 | 1/1984 | Rogers | 502/150 |
| 4,434,242 | 2/1984 | Roling et al. | 502/107 |
| 4,435,518 | 3/1984 | Pennington et al. | 502/107 |
| 4,435,519 | 3/1984 | Veazey et al. | 502/107 |
| 4,435,520 | 3/1984 | Aylward | 502/120 X |
| 4,508,842 | 4/1985 | Beran et al. | 502/112 |
| 4,544,646 | 10/1985 | Pullukat et al. | 502/116 X |
| 4,559,318 | 12/1985 | Smith et al. | 502/110 |
| 4,611,038 | 9/1986 | Brun et al. | 526/169.2 |
| 4,663,404 | 5/1987 | Invernizzi et al. | 502/113 X |
| 4,710,552 | 12/1987 | Bachl et al. | 526/116 |
| 4,754,007 | 5/1988 | Pullukat et al. | 526/130 |
| 4,810,761 | 3/1989 | Zoeckler et al. | 526/124 |
| 4,812,432 | 3/1989 | Zoeckler et al. | 502/112 |
| 4,831,090 | 5/1989 | Bachl et al. | 526/116 |
| 4,886,021 | 9/1989 | Miro et al. | 502/103 X |
| 4,918,038 | 4/1990 | Samuels et al. | 502/119 X |
| 5,079,205 | 1/1992 | Canich | 502/103 X |

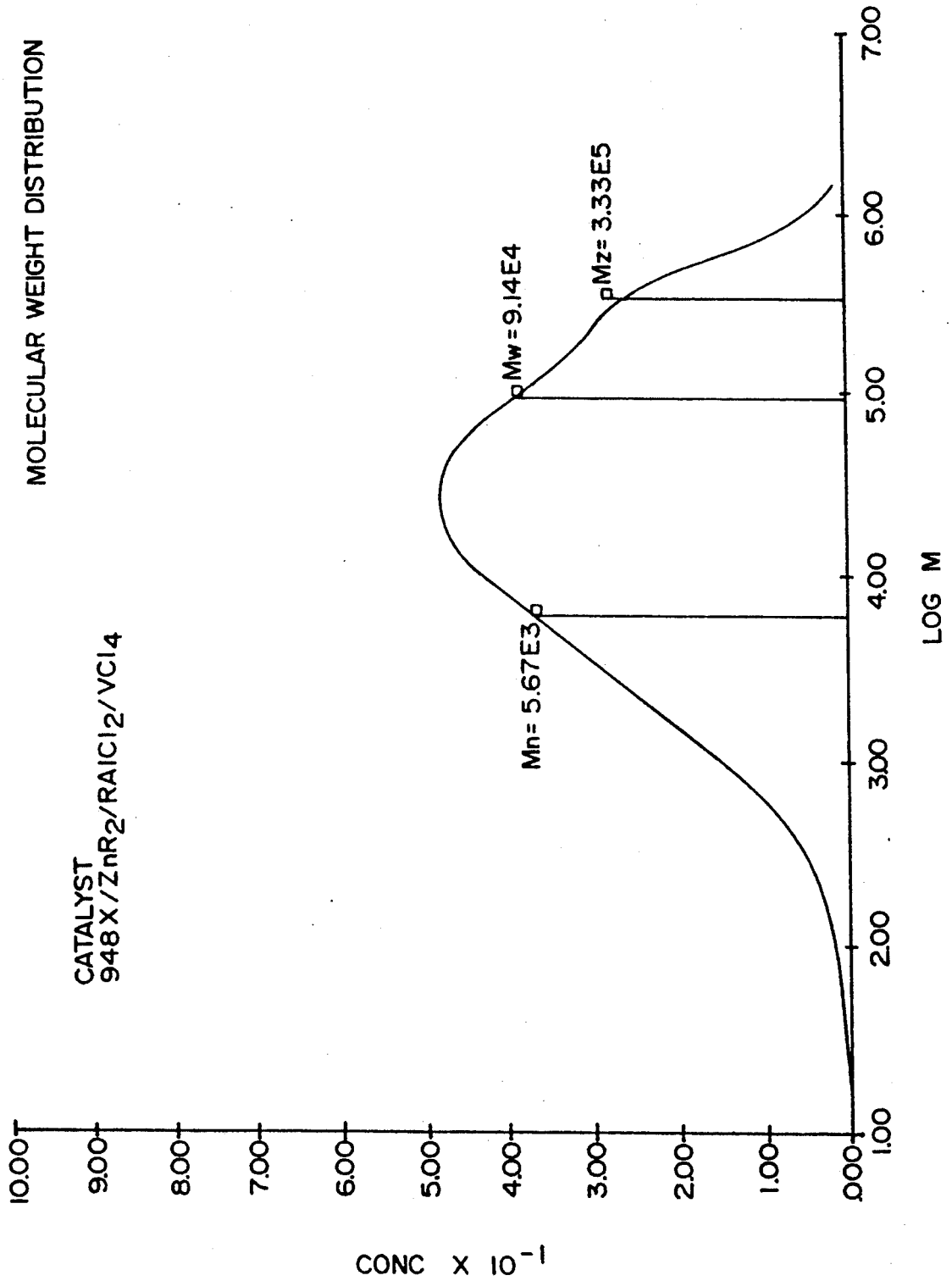

VANADIUM-CONTAINING POLYMERIZATION CATALYST

BACKGROUND OF THE INVENTION

1. Field of the Invention

The present invention relates to a vanadium-containing polymerization catalyst that is especially useful in low temperature, low pressure ethylene polymerization processes. The catalyst of the present invention produces polymer at a high level of catalyst activity. The catalyst of the present invention is designed to provide a high level of response to hydrogen as a molecular weight control agent. The subject catalyst further produces polymer that has a bimodal molecular weight distribution. Compositionally, the catalyst of the present invention comprises a solid inorganic oxide or inorganic phosphate (or mixtures thereof), and compositions of zinc and vanadium.

2. Description of the Prior Art

Vanadium-containing compositions have for some time been proposed for use in polymerization catalyst systems. Such catalysts, however, have had relatively little use on a commercial scale since the polymers produced therewith were produced at a relatively low level of catalyst activity and/or the catalysts produced polymer with poor morphology and/or had the tendency to foul the reactor during polymerization. Accordingly, vanadium-containing catalyst systems have not achieved widespread use in polymerization—particularly olefin polymerization—as have titanium or chromium based catalysts. The development of commercially useful vanadium-containing polymerization catalysts has been particularly elusive despite the advantages attendant these systems, such as easier recovery and better handleability of the catalyst as well as greater control over the shape and size of the polymer particle and the overall superior quality of the polymer particle thus produced.

Examples of the development of vanadium-containing catalyst systems include: U.S. Pat. No. 3,786,032 which describes a catalyst used to polymerize vinyl and vinylidene halides, the catalyst being formed from an inert solid matrix, vanadium compounds and an organozinc complexed with an oxime. U.S. Pat. No. 4,559,318 discloses a vanadium dihalide complexed with an ether, such as tetrahydrofuran, and a zinc compound. The catalyst includes a porous support. U.S. Patent No. 4,611,038 describes an olefin polymerization catalyst system prepared from a vanadium metal component, a porous support, and an organo-zinc compound; to yield the active solid hydrocarbon catalyst system, a controlled amount of prepolymerization takes place with this composition.

A more recent attempt to produce a vanadium-containing catalyst composition that produces alpha olefin polymers is described in U.S. Pat. No. 4,866,021. The catalyst system utilized therein incorporates supported vanadium, aluminum, and zinc compounds and further requires the presence of titanium.

In addition to producing polymers having less than desirable physical characteristics, the catalysts thus recognized are not easily fabricated. In summary, there is a continuing need in the art for a vanadium-containing catalyst that is useful in olefin polymerization.

SUMMARY OF THE INVENTION

The present invention is directed to a vanadium-containing catalyst. The catalyst of the present invention has a high activity and especial utility in low pressure, low temperature ethylenic and alpha-olefinic polymerization processes, such as ethylene homopolymerization and co-polymerization with, for example, 1-hexene.

The catalyst of the present invention also has a high level of response to hydrogen as a molecular weight control agent.

The catalyst of the present invention further produces a polymer, particularly a ethylene polymer, that can have a narrow to broad molecular weight distribution, characterized by a bimodal profile. The polymer thus produced has good particle morphology and high bulk density.

In accordance with the present invention a vanadium-containing catalyst is provided. The catalyst comprises the product obtained by admixing a solid inorganic oxide, inorganic phosphate or mixtures thereof; a zinc-containing composition selected from the group consisting of a zinc compound having the formula $$ZnR_2$$

wherein R is hydrocarbyl having 1 to about 12 carbon atoms, a zinc complex having the formula $$ZnX_2 \cdot 2AlR^1_3$$

wherein X is halogen and $R^1$ is hydrocarbyl having 1 to about 12 carbon atoms, and mixtures thereof; and a vanadium-containing composition selected from the group consisting of compounds having the formula $$VX^1_b(OR^2)_{a-b}$$

wherein $X^1$ is halogen, $R^2$ is hydrocarbyl having from 1 to about 18 carbon atoms, a is the valence of vanadium and is 3 or 4, and b is 0 or an integer from 1 to a, $$VOX^2_c(OR^3)_{3-c}$$

wherein $X^2$ is halogen, $R^3$ is hydrocarbyl having 1 to about 18 carbon atoms, and c is 0 or an integer from 1 to 3, and mixtures thereof.

An auxiliary composition may also be incorporated into the catalyst to enhance or control catalyst activity, the response to hydrogen during the polymerization reaction, and/or the molecular weight distribution of the polymer product.

An auxiliary composition useful in this regard is selected from the group consisting of compounds having the formula $$M(R^4)_dX^3_{3-d}$$

wherein M is aluminum (Al) or boron (B), $X^3$ is halogen, $R^4$ is hydrocarbyl having 1 to about 12 carbon atoms and d is 0 or an integer from 1 to 3, $$Al_2(R^5)_3(X^4)_3$$

wherein $R^5$ is hydrocarbyl having 1 to about 12 carbon atoms and $X^4$ is halogen, $$MgR^6_e Y_{2-e}$$

wherein $R^6$ is hydrocarbyl having 1 to about 12 carbon atoms, Y is halogen, or has the formula $OR^7$ where $R^7$ is hydrocarbyl or Y is a silyl amide having the formula $N(SiR_3^8)_2$ where $R^8$ is hydrocarbyl and e is 0, 1 or 2, and mixtures thereof.

In another aspect of the present invention, an olefin polymerization process is disclosed. In this process, olefins such as ethylene and/or one or more alpha-olefins are contacted with the above-defined vanadium-containing catalyst, a co-catalyst and, optionally, a promotor under polymerization conditions effective to obtain a homopolymer or copolymer. The olefin polymerization catalyst system of the present invention is useful in gas phase, slurry and solution polymerization processes and finds particular utility in producing ethylene homopolymer, or a copolymer of ethylene and one or more alpha-olefins. The polymer thus produced has high molecular weight and narrow to broad molecular weight distribution.

BRIEF DESCRIPTION OF DRAWING

The FIGURE illustrates the typical bimodal molecular weight distribution obtained in slurry homopolymerization of ethylene utilizing a catalyst of the present invention. The catalyst was the product obtained by admixing silica; a zinc dialkyl—such as zinc diethyl; an aluminum halide compound, here an aluminum alkyl halide such as ethyl aluminum dichloride; and a vanadium halide, such as vanadium tetrachloride.

DETAILED DESCRIPTION OF THE INVENTION

The solid inorganic oxide or inorganic phosphate employed in the catalyst of the subject invention is preferably a porous particulate material, and is preferably spherical in shape; an average particle size of 20 to about 100 microns is preferred, as is a high surface area and high pore volume. Suitable inorganic oxides in this regard include, e.g., silica, alumina; a suitable inorganic phosphate is, e.g., aluminum phosphate. Mixtures of solid inorganic oxides and inorganic phosphates may also be utilized in the practice of the present invention.

No pretreatment or modification to the inorganic oxide or inorganic phosphate is required; however, in practicing the present invention, it is preferred that the inorganic oxide or inorganic phosphate be pretreated to reduce the surface hydroxyl content. In one embodiment, this pretreatment is effected by calcining the inorganic oxide or inorganic phosphate in an inert atmosphere, preferably at a temperature of at least 200° C. More preferably, the pretreatment involves calcining the inorganic oxide or inorganic phosphate at a temperature in the range of between about 550° C. and about 650° C. in an inert atmosphere, preferably a nitrogen atmosphere. A preferred time period for calcining is between about 3 to about 8 hours.

In another embodiment, the removal of surface hydroxyl groups is accomplished by treating the silica with a hexa-alkyl disilazane. Of the hexa-alkyl disilazanes useful in this application, hexamethyl disilazane (HMDS) is preferred.

A preferred inorganic oxide is silica; the preferred surface area is about 50 to about 800 m$^2$/gram; more preferably about 300 m$^2$/gram. The preferred pore volume is about 0.5 to about 4.0 cm$^3$/gram; more preferably about 1 to about 3.1 cm$^3$/gram; still more preferably about 1.5 to about 2.5 cm$^3$/gram; most preferably about 1.6 cm$^3$/gram. Silica which meets these criteria can be commercially obtained in grade 948 or 948X from W.R. Grace & Co. Davison Chemical Division, Baltimore, Md. Other useful and commercially available inorganic oxide constituents include Crosfield EP-10 and EP-17MS (from Crosfield Catalysts, Warrington, England). The prefix ST in ST-948X signifies that the silica has been previously processed with HMDS.

The pretreated inorganic oxide, inorganic phosphate or mixtures thereof, is in a preferred embodiment, modified by treatment with a modifying compound. Modifying compounds within the contemplation of the present invention include monofunctional phosphorus compounds, polyfunctional phosphorus compounds, monofunctional organic silicon compounds, polyfunctional organic silicon compounds and fluorine compounds, as described variously in U.S. Pat. Nos. 4,359,403; 4,455,386; 4,530,912 and 4,530,913; the modifying treatments related therein are incorporated into the instant specification by reference.

Mixtures of modifying compounds may also be utilized.

Though not required in the practice of the present invention, a hydrocarbon solvent may be employed as a medium for the preparation of the instant catalyst. Non-polar solvents, e.g., alkanes—such as hexane and heptane, cycloalkanes and aromatics, are preferred. If a solvent is utilized, it is preferred that the solvent is dried in order to remove water. Drying in this regard may be accomplished by a molecular sieve.

In embodiments wherein a solvent is employed, it is preferred that the amount of solvent employed conform to a ratio of about 50 milliliters (mls) of solvent for about every 3 to 5 grams of solid inorganic oxide, inorganic phosphate or mixtures thereof. The solvent may be allowed to remain throughout preparation of the catalyst and can be removed by decantation, filtration or evaporation.

The catalyst of the present invention is the product obtained by admixing a solid inorganic oxide, inorganic phosphate or mixtures thereof, as discussed immediately above, with a zinc-containing composition and a vanadium-containing composition, as defined hereinbelow. It should be appreciated that no particular sequence of admixing is required, and that the present invention contemplates simultaneous admixing as well as any combination of sequential admixing. Although no particular sequence of admixing need be adhered to, a preferred embodiment of the present invention admixes the solid inorganic oxide, inorganic phosphate or mixtures thereof, with a zinc-containing composition, followed by a vanadium-containing composition.

Admixing preferably occurs at or about room temperature and at or about atmospheric pressure; thus no special heating or cooling, and no pressurization or vacuum are necessary, although these may be employed without detriment. If other than simultaneous admixing is employed, no specific time period need elapse between the addition of any one or more of solid inorganic oxide or inorganic phosphate, zinc-containing composition and vanadium-containing composition. If sequential admixing is utilized, however, it is preferred that about 30 minutes elapses between additions.

Stirring, though not necessary, is preferred.

The zinc-containing composition useful in the present invention include zinc compounds and zinc complexes, as now defined. The zinc compound of the subject invention has the formula $$ZnR_2$$

wherein R is hydrocarbyl having 1 to about 12 carbon atoms; preferably 2 to about 6 carbon atoms. As a hydrocarbyl, R is, depending on the number of carbon atoms, preferably alkyl, cycloalkyl, aryl, aralkyl or alkaryl. A preferred zinc compound is diethyl zinc.

The zinc-containing composition may also be a zinc complex having the formula $$ZnX_2 \cdot 2AlR^1{}_3$$

wherein X is halogen and $R^1$ is hydrocarbyl having 1 to about 12 carbon atoms; preferably 2 to about 6 carbon atoms. As a hydrocarbyl, $R^1$ is, depending on the number of carbon atoms, preferably alkyl, cycloalkyl, aryl, aralkyl or alkaryl. X is preferably chlorine.

In the practice of the invention, a zinc complex may be formed by contacting a zinc halide with an aluminum alkyl. Preferably, the zinc complex is formed by contacting about one mole of zinc chloride, with about two moles of triethylaluminum; the formula of this particular zinc complex is $ZnCl_2 \cdot 2Al(C_2H_5)_3$. The zinc complex-forming step preferably occurs separately, before incorporation into the admixture; it can, however, occur upon addition of sufficient quantities of zinc halide and aluminum alkyl to the admixture, thus forming the zinc complex in situ. The complex formed in either case is soluble in non-polar solvents, such as heptane.

As between individually utilizing the zinc compound or the zinc complex, the latter may result in a broader molecular weight distribution for the polymer, while the former may result in higher activity for the catalyst. The zinc complex, in any event, is found to be more cost effective in the overall production of the catalyst.

Mixtures of zinc-containing compositions may also be utilized in practicing the invention.

Zinc-containing composition, be it the zinc compound, zinc complex, or mixtures thereof, is used in preparing the catalyst of the instant invention in an amount of about 0.1 to about 3.0 millimoles per gram of inorganic oxide, inorganic phosphate or mixtures thereof; preferably in an amount of about 0.5 to about 2.0 millimoles; more preferably an amount of about 1.0 millimole of zinc-containing composition is admixed per gram of inorganic oxide, inorganic phosphate, or mixtures thereof.

The vanadium-containing composition useful in the instant invention has the formula $$VX_b{}^1(OR^2)_{a-b}$$

where $X^1$ is halogen, $R^2$ is hydrocarbyl having 1 to about 18 carbon atoms, a is the valence of vanadium and is 3 or 4 and b is 0 or an integer from 1 to a. Preferably, $R^2$ has 2 to about 6 carbon atoms. As a hydrocarbyl, $R^2$ is preferably alkyl, and depending on the number of carbon atoms, cycloalkyl, aryl, aralkyl or alkaryl. X is preferably chlorine. An example of a preferred vanadium-containing composition having this formula is vanadium tetrachloride ($VCl_4$).

A vanadium-containing composition also useful in the practice of the present invention has the formula $$VOX_c{}^2(OR^3)_{3-c}$$

where $X^2$ is halogen, $R^3$ is hydrocarbyl having 1 to about 18 carbon atoms and c is 0 or an integer from 1 to 3. Preferably, $R^3$ has 2 to about 6 carbon atoms. As a hydrocarbyl, $R^3$ is preferably alkyl and, depending on the number of carbon atoms, cycloalkyl, aryl, aralkyl or alkaryl. $X^2$ is preferably chlorine. Examples of preferred vanadium-containing compositions having this formula include vanadyl chloride ($VOCl_3$) and vanadyl isopropoxide ($VO(iOC_3H_7)_3$).

Mixtures of vanadium-containing compositions may also be utilized in the present invention.

Vanadium-containing composition is added in preparing said catalyst in an amount of about 0.01 to about 3.0 millimoles per gram of inorganic oxide, inorganic phosphate or mixtures thereof; preferably about 0.5 to about 2.0 millimoles; more preferably about 1.0 millimole of vanadium-containing composition is added per gram of inorganic oxide, inorganic phosphate or mixtures thereof.

After admixing the inorganic oxide, inorganic phosphate or mixtures thereof, the zinc-containing composition and the vanadium-containing composition, the catalyst product thus obtained can be recovered. If a solvent has been used, it is preferable of the solvent is removed by, e.g., decantation, filtration or evaporation. If evaporation is employed, it is preferred that a nitrogen purge at a temperature of about 100° C. be utilized.

It should be appreciated that the catalyst of the present invention is preferably prepared in an inert atmosphere, such as a nitrogen atmosphere. Further, in preparing the catalyst of the invention, it is desirable that the admixing is conducted under conditions that are substantially free of oxygen. Thus in a preferred embodiment no more than 100 ppm of oxygen, based on the weight of the gaseous atmosphere, is present during catalyst preparation. More preferably, no more than 10 ppm of oxygen is present, and most preferably, no more than 1 ppm of oxygen is present, based on the weight of the gaseous atmosphere. It is also desirable that the admixing is conducted under conditions that are substantially free of water. Thus in a preferred embodiment, no more than 5% by weight of water, based on the weight of the admixture, is present during catalyst preparation. More preferably, no more than 0.5% by weight of water, and most preferably no more than 0.05% by weight of water is present, based on the weight of the admixture.

An auxiliary composition may, optionally, be incorporated into the admixture to enhance or control polymer and/or catalytic properties.

An auxiliary composition useful in the practice of this embodiment of the present invention has the formula $$M(R^4)_d X^3{}_{3-d}$$

where M is aluminum (Al) or boron (B), $R^4$ is hydrocarbyl having 1 to about 12 carbon atoms, $X^3$ is halogen and d is 0 or an integer from 1 to 3. Preferably, $R^4$ has 2 to about 6 carbon atoms. As a hydrocarbyl, $R^4$ is preferably alkyl, and depending on the number of carbon atoms, cycloalkyl, aryl, aralkyl, or alkaryl. $X^3$ is preferably chlorine. Examples of preferred auxiliary compositions having this formula include diethyl aluminum chloride (($C_2H_5)_2AlCl$), ethyl aluminum dichloride ($C_2H_5AlCl_2$), ethyl boron dichloride ($C_2H_5BCl_2$) and boron trichloride ($BCl_3$).

An auxiliary composition also useful in the practice of the present invention has the formula $$Al_2R^5{}_3X^4{}_3$$

wherein $R^5$ is a hydrocarbyl having 1 to about 12 carbon atoms and $X^4$ is halogen. Preferably, $R^5$ has 2 to about 6 carbon atoms. As a hydrocarbyl, $R^5$ is preferably alkyl, and depending on the number of carbon atoms present, cycloalkyl, aryl, aralkyl or alkaryl. $X^4$ is preferably chlorine. An example of a preferred auxiliary composition having this formula is aluminum sesquichloride $((C_2H_5)_3Al_2Cl_3)$.

An auxiliary composition further useful in the practice of the present invention has the formula $$MgR_e{}^6Y_{2-e}$$

where $R^6$ is hydrocarbyl having 1 to about 12 carbon atoms, Y is halogen, or has the formula $OR^7$ where $R^7$ is hydrocarbyl having 1 to about 12 carbon atoms, or is a silyl amide having the formula $N(SiR_3{}^8)_2$ where $R^8$ is hydrocarbyl having 1 to about 12 carbon atoms, and e is 0, 1 or 2. Preferably, $R^6$, $R^7$ and $R^8$ have 2 to about 6 carbon atoms, respectively. As hydrocarbyls, $R^6$, $R^7$ and $R^8$ are preferably alkyl, and depending on the number of respective carbon atoms, cycloalkyl, aryl, aralkyl or alkaryl. The preferred halogen is chlorine. Examples of auxiliary compositions having this formula include dibutyl magnesium $((C_4H_9)_2Mg)$, butyl ethyl magnesium $(C_4H_9MgC_2H_5)$ and butyl magnesium silyl amide, e.g., $C_4H_9MgN (Si(CH_3)_3)_2$, also known as BMSA.

Mixtures of auxiliary compositions may also be used in practice of the invention.

Auxiliary composition, when utilized, is admixed in preparing said catalyst in an amount of about 0.1 to about 3.0 millimoles per gram of inorganic oxide, inorganic phosphate or mixtures thereof. Preferably about 0.5 to about 2.0 millimoles, and more preferably about 1.0 millimole of auxiliary composition is present in said catalyst per gram of inorganic oxide, inorganic phosphate, or mixtures thereof.

The admixing of the auxiliary composition need not occur at any particular point in catalyst preparation and may occur concurrently or interspersedly with the admixing of the inorganic oxide, inorganic phosphate or mixtures thereof, and the zinc-containing composition and vanadium-containing composition. Thus, for example, the auxiliary composition may be introduced before or after any of the inorganic oxide, inorganic phosphate or mixtures thereof and/or the zinc-containing composition and/or the vanadium-containing composition. The auxiliary composition is, in any event, preferably introduced into the admixture as a solution in a nonpolar hydrocarbon solvent. Alkanes, such as hexane or heptane, are preferred although cycloalkanes and aromatics may also be used. Mixtures of such solvents may also be provided.

The product obtained by the admixture represents the catalyst of the instant invention, which when combined with a co-catalyst forms an olefin polymerization catalyst system. A co-catalyst useful in the practice of this aspect of the present invention includes, e.g., a metal alkyl, metal alkyl hydride, metal alkyl halide, or metal alkyl alkoxide—where the metal is aluminum, boron, zinc, or magnesium and the alkyl has 1 to about 12 carbon atoms, preferably 2 to about 6 carbon atoms; mixtures of such co-catalysts, may also be employed with the catalyst. Aluminum trialkyls are preferred, with triethylaluminum and/or tri-isobutyl-aluminum especially preferred.

Co-catalyst, when present, is present in an amount that conforms to a molar ratio of co-catalyst to vanadium-containing composition of about 1:1 to about 200:1; a more preferred ratio is about 1:1 to about 50:1, co-catalyst to vanadium-containing composition. The vanadium-containing catalyst and the co-catalyst may be added continuously to the polymerization reactor during the course of the polymerization to maintain the desired ratio.

In addition, during the course of polymerization, a promotor for the vanadium-containing catalyst system may be fed into the reactor. The promotor functions to make the vanadium more active. Surprisingly, although this effect of increased activity is true for vanadium, the promotor will nevertheless poison other transition metals, if any are present in the catalyst system of the instant invention. Titanium is particularly susceptible to this poisoning.

The promotor useful in the practice of the present invention has the formula $$R_f{}^9CX_{4-f}{}^5$$

wherein $R^9$ is hydrogen, or an unsubstituted or halogen substituted alkyl having 1 to about 6 carbon atoms; $X^5$ is halogen, preferably chlorine, and f is 0, 1 or 2. Examples of promotors having this formula include fluoro, chloro or bromo substituted ethane or methane compounds having at least two halogens attached to the carbon atom. Especially preferred promotors include $CCl_4$, $CH_2Cl_2$, $CBr_4$, $CH_3CCl_3$, $CF_2ClCCl_3$, with the most especially preferred being $CHCl_3$ (chloroform), $CFCl_3$ (Freon 11) and $CFCl_2CCF_2Cl$ (Freon 113). Mixtures of promotors may also be used.

The amount of promotor, when utilized is present in an amount that conforms to a molar ratio of promotor to vanadium-containing composition of about 0.1:1 to about 200:1, a more preferred ratio is about 1:1 to about 50:1, promotor to vanadium-containing composition.

The polymerization reaction may be conducted under solution, slurry or gas phase conditions, at temperatures of about 50° to about 150° C., and pressures of about ambient to about 3000 psi. Preferred temperature is about 90° to 100° C.; preferred pressure is about 500 to 600 psi.

The variation in molecular weight distribution of the polymers produced with the catalyst of the present invention, i.e., from narrow to broad molecular weight distribution, is determined by the particular embodiment of the catalyst of the present invention that is utilized, including co-catalyst and promotor. Examples of the various molecular weight distributions, from narrow to broad, obtainable with the catalyst system of the present invention are provided at Table 2, where those skilled in the art will recognize that the melt index ratio (HLMI/MI) correlates to molecular weight distribution (MWD).

The polymer obtained by the process of the present invention may be a homopolymer of ethylene, a homopolymer of an alpha-olefin, a copolymer of two or more alpha-olefins, or a copolymer of ethylene and one or more alpha-olefins, said alpha-olefins having 3 to about 12 carbon atoms. Alpha-olefins particularly useful in the present invention include propylene, 1-butene, 1-pentene, 1-hexene, 1-octene, 1,3-butadiene and 1,5-hexadiene.

The polymer thus produced can have a melt index (MI) at 190° C. and 2.16 kg (as measured by ASTM D1238-82) as high as up to about 1000, including a melt index as low as about 0.01 or less. The polymer can have a high load melt index (HLMI), at 190° C. and 21.6 kg, of up to and greater than about 1; the melt index ratios (HLMI/MI) of the polymer capable of being produced will vary depending on the above parameters of HLMI and MI; for example, the HLMI/MI may be between about 25:1 to about 150:1; the melt index ratio correlates to molecular weight distribution (MWD).

The polymer produced by the catalyst of the present invention does not require polymer de-ashing to be commercially acceptable in low ash polymer applications.

The polymer of the present invention also exhibits a bimodal molecular weight distribution profile, as when examined by gel permeation chromatography with 1,2,4 trichlorobenzene as a solvent. The molecular weight distribution of the polymer produced by the catalyst of the present invention may be readily determined, such as from a relatively narrow range (e.g., 30 to 50 HLMI/MI) to a relatively broad range (e.g., 70 to 150 HLMI/MI), by selecting the particular catalyst composition as indicated, for example, by Table 2.

The catalyst system of the present invention may be readily used under solution, slurry, or gas phase (including fluidized bed) polymerization conditions.

The following examples are merely illustrative of the scope of the present invention and are not intended as a limitation therein.

EXAMPLES 1-9

A series of nine experiments were conducted to demonstrate the advantages of the catalyst systems of the present invention in the polymerization of ethylene. A different catalyst composition was used in each of such examples. Each obtained a polymer having different HLMI/MI values.

In Examples 1 to 8 the inorganic oxide was a porous particulate silica, spherical in shape, having an average particle size of 30 microns and a surface area of about 300 m²/gram. About 5 grams of this silica was used in each example. The silica was pre-treated by being heated with nitrogen at 200° C. for 5 hours. The inorganic oxide used in Example 9 was the same silica material, pretreated in the same fashion; the silica of Example 9 was however modified, as is known in the art, with hexamethyl-disilazane (HMDS) in order to convert silanol groups to trimethylsiloxy groups.

The zinc-containing composition and vanadium-containing composition, as well as any auxiliary composition used to form the catalyst, and the amount thereof in millimoles per gram of silica, are shown below in Table 1. The sequence of addition of mixture to the inorganic oxide reads from left to right in Table 1.

TABLE 1

| EXAMPLE # | COMPOSITIONS ADMIXED WITH THE SILICA | | | |
|---|---|---|---|---|
| 1 | $Zn(C_2H_5)_2$ | | $VOCl_3$ | |
|  | 1.0 mM/g | | 1.0 mM/g | |
| 2 | $Zn(C_2H_5)_2$ | | $VCl_4$ | |
|  | 1.0 mM/g | | 1.0 mM/g | |
| 3 | $Zn(C_2H_5)_2$ | $(C_2H_5)_2AlCl$ | $VOCl_3$ | |
|  | 1.0 mM/g | 1.0 mM/g | 1.0 mM/g | |
| 4 | $Zn(C_2H_5)_2$ | $BCl_3$ | $VOCl_3$ | |

TABLE 1-continued

| EXAMPLE # | COMPOSITIONS ADMIXED WITH THE SILICA | | | |
|---|---|---|---|---|
|  | 1.0 mM/g | 0.36 mM/g | 1.0 mM/g | |
| 5 | BMSA* | $Zn(C_2H_5)_2$ | $VOCl_3$ | |
|  | 0.5 mM/g | 0.75 mM/g | 1.0 mM/g | |
| 6 | $Zn(C_2H_5)_2$ | $C_2H_5AlCl_2$ | $VOCl_3$ | |
|  | 1.0 mM/g | 0.75 mM/g | 0.75 mM/g | |
| 7 | $Zn(C_2H_5)_2$ | $C_2H_5AlCl_2$ | $VCl_4$ | |
|  | 1.0 mM/g | 0.75 mM/g | 1.0 mM/g | |
| 8 | $C_2H_5AlCl_2$ | $Zn(C_2H_5)_2$ | $VO(iOC_3H_7)_3$ | $C_2H_5AlCl_2$ |
|  | 0.75 mM/g | 1.0 mM/g | 0.75 mM/g | 0.75 mM/g |
| 9 | $Zn(C_2H_5)_2$ | $C_2H_5AlCl_2$ | $VCl_4$ | |
|  | 1.0 mM/g | 0.5 mM/g | 1.0 mM/g | |

*BMSA is butylmagnesium bis(trimethylsilyl)amide, prepared as described in U.S. Pat. No. 4,383,119.

The catalysts of Examples 1-9, prepared as described above, were each used to homopolymerize ethylene under slurry polymerization conditions in a slurry polymerization reactor. Each of the polymerization reactions was conducted in 600 milliliters of isobutane at a temperature of about 93.3° C. and a total pressure of about 550 psi. The reactions were each conducted for about 60 minutes. Ethylene concentration in isobutane was about 20 mole percent and was maintained at this level at all times of the polymerization reaction by the constant feeding of ethylene into the reactor. About 40 milligrams of the catalyst shown in Table I was used in each polymerization example.

The catalyst and a catalyst promotor (chloroform) were injected into the reactor at full reactor pressure, that is, pressure from $H_2$, isobutane and ethylene. About 0.5 milliliters of an aluminum alkyl cocatalyst (triethyl aluminum) was syringed into the reactor for each experiment as a 25 weight percent solution thereof in heptane. The mol ratio of hydrogen ($H_2$) to ethylene ($C_2=$) used in the experiments was either 0.077:1 or 0.155:1. The mol ratio of promotor ($CHCl_3$), when used, to vanadium-containing composition $$\left(\frac{promotor}{V}\right)$$

was either 20:1 or 50:1. The mol ratio of cocatalyst to vanadium-containing composition (Al/V) ranged from 5:1 to 25:1, respectively.

Table 2, below, shows the mol ratios of the various materials that were used and the results that were obtained therewith in terms of catalyst reactivity (grams polyethylene/grams of total catalyst per hour of reaction time), the melt index (MI), and melt index ratio (HLMI/MI) of the polymer products relative to the particular catalyst system used.

The catalyst of Example 6 was used in two polymerization experiments: (a) and (b), the difference being the presence or absence of promotor used in Examples 6(a) and 6(b), respectively.

TABLE 2

| Catalyst from Example # | Polymerization Results: | | | | | |
|---|---|---|---|---|---|---|
|  | Reactivity: gm PE/ gm cat-hr | MI | HLMI/MI | $H_2/C_2$ | Al/V | Promoter/V |
| 1 | 2436 | 0.10 | 85 | 0.077 | 10 | 20 |
| 2 | 2455 | 0.17 | 113 | 0.155 | 10 | 20 |
| 3 | 6400 | 0.74 | 77 | 0.155 | 25 | 50 |
| 4 | 3275 | 0.42 | 71 | 0.155 | 25 | 50 |

TABLE 2-continued

| Catalyst from Example # | Reactivity: gm PE/ gm cat-hr | MI | HLMI/MI | $H_2/C_2$ | Al/V | Promoter/V |
|---|---|---|---|---|---|---|
| 5 | 3050 | 2.01 | 67 | 0.155 | 25 | 50 |
| 6 (a) | 6000 | 0.52 | 83 | 0.155 | 25 | 50 |
| 6 (b) | 2600 | 0.64 | 69 | 0.155 | 25 | None |
| 7 | 2045 | 0.6 | 132 | 0.155 | 10 | 20 |
| 8 | 2775 | 14.0 | 37 | 0.077 | 25 | 50 |
| 9 | 2940 | 0.17 | 91 | 0.077 | 5 | 20 |

The polymers produced in these examples, illustrating the use of the catalyst of the present invention, had bimodal molecular weight distributions, as illustrated by the molecular weight distribution curve shown in the FIGURE. The MWD curve shown in the FIGURE was specifically obtained on the basis of a gel permeation (GPC) analysis of the polymer produced by the catalyst of Example 7.

EXAMPLE 10

Catalyst Preparation Using a Zinc Complex

A zinc complex was prepared from zinc dichloride ($ZnCl_2$) and triethyl aluminum ($Al(C_2H_5)_3$); heptane was used as solvent.

Zinc dichloride in an amount of 0.25 moles (34.05 gm) was added into a Fisher-Poter bottle in a dry box. Triethyl aluminum in heptane was added in an amount of 320.5 ml (corresponding to 0.5M). The concentration of the triethyl aluminum was 1.56 millimoles per milliliter; the ratio of zinc to aluminum was, given these quantities, 1:2. The solution was heated, up to 90° C. for a time of two hours and the resultant mixture allowed to settle to obtain the zinc complex.

Silica, grade 948X, was calcined for five hours at 220° C. To 5.30 gm of this pre-treated silica was added, upon cooling, 53 ml of heptane to form the slurried inorganic oxide constituent. The zinc complex was added in an amount of 4.08 ml (corresponding to 0.6 millimoles per gram of silica). The admixture was allowed to react for about 30 minutes. At the end of this time, 5.30 ml of $VOCl_3$, corresponding to 1.0 millimole per gram of silica, was added in a dropwise fashion; this reaction was allowed to proceed at room temperature for about 30 minutes. The slurry was then evaporated to dryness with nitrogen at 105° C. to obtain the zinc complex containing catalyst.

What is claimed is:

1. A catalyst comprising the product obtained by admixing:
(a) a solid inorganic oxide, inorganic phosphate, or mixtures thereof;
(b) a zinc-containing composition selected from the group consisting of a zinc compound having the formula $$ZnR_2$$

wherein R is a hydrocarbyl having 1 to about 12 carbon atoms, a zinc complex having the formula $$ZnX_2 \cdot 2AlR_3^1$$

wherein X is halogen and $R^1$ is hydrocarbyl having 1 to about 12 carbon atoms, and mixtures thereof; and (c) a vanadium-containing composition selected from the group consisting of compounds having the formula $$VX_b^1(OR^2)_{a-b}$$

wherein $X^1$ is a halogen, $R^2$ is hydrocarbyl having 1 to about 18 carbon atoms, a is the valence of vanadium and is 3 or 4, and b is 0 or an integer from 1 to a, $$VOX^2_c(OR^3)_{3-c}$$

wherein $X^2$ is halogen, $R^3$ is hydrocarbyl having 1 to about 18 carbon atoms, and c is 0 or an integer from 1 to 3, and mixtures thereof, wherein said product does not contain titanium.

2. The catalyst of claim 1 wherein said product obtained further comprises in admixture with components (a), (b) and (c):
(d) an auxiliary composition selected from the group consisting of compounds having the formula $$M(R^4)_d X^3_{3-d}$$

wherein M is Al or B, $X^3$ is halogen, $R^4$ is hydrocarbyl having to about 12 carbon atoms, and d is 0 or an integer from 1 to 3, $$Al_2(R^5)_3(X^4)_3$$

wherein $R^5$ is hydrocarbyl having 1 to about 12 carbon atoms and $X^4$ is halogen, $$MgR_e^6 Y_{2-e}$$

wherein $R^6$ is hydrocarbyl having 1 to about 12 carbon atoms, Y is halogen, has the formula $OR^7$ where $R^7$ is hydrocarbyl having 2 to about 12 carbon atoms, or is a silyl amide having the formula $N(SiR_3^8)_2$ where $R^8$ is hydrocarbyl having 2 to about 12 carbon atoms, and e is 0, 1 or 2, and mixtures thereof.

3. The catalyst of claim 1 wherein R is alkyl, cycloalkyl, aryl, aralkyl, alkaryl or mixtures thereof.

4. The catalyst of claim 3 wherein R is alkyl having 2 to about 6 carbon atoms.

5. The catalyst of claim 1 wherein $R^1$ is alkyl having 2 to about 6 carbon atoms.

6. The catalyst of claim 1 wherein X is chlorine.

7. The catalyst of claim 1 wherein said zinc-containing composition is $Zn(C_2H_5)_2$, $ZnCl_2 \cdot 2Al(C_2H_5)_3$ or mixtures thereof.

8. The catalyst of claim 1 wherein $R^2$ is alkyl having 2 to about 6 carbon atoms.

9. The catalyst of claim 1 wherein $X^1$ is chlorine.

10. The catalyst of claim 1 wherein $R^3$ is alkyl having 2 to about 6 carbon atoms.

11. The catalyst of claim 1 wherein $X^2$ is chlorine.

12. The catalyst of claim 1 wherein said vanadium-containing composition is $VCl_4$, $VOCl_3$, $VO(iOC_3H_7)_3$ or mixtures thereof.

13. The catalyst of claim 2 wherein $R^4$ is alkyl, having 2 to about 6 carbon atoms.

14. The catalyst of claim 2 wherein $X^3$ is chlorine.

15. The catalyst of claim 2 wherein $R^5$ is alkyl having 2 to about 6 carbon atoms.

16. The catalyst of claim 2 wherein $X^4$ is chlorine.

17. The catalyst of claim 2 wherein $R^6$ is alkyl having 2 to about 6 carbon atoms.

18. The catalyst of claim 2 wherein $R^7$ is alkyl having 2 to about 6 carbon atoms.

19. The catalyst of claim 2 wherein $R^8$ is alkyl having 2 to about 6 carbon atoms.

20. The catalyst of claim 2 wherein said auxiliary composition is $(C_2H_5)_2AlCl$, $C_2H_5AlCl_2$, $(C_2H_5)_3Al_2Cl_3$, $(C_4H_9)_2Mg$, $(C_4H_9)(C_2H_5)Mg$, $C_2H_5BCl_2$, $BCl_3$, $C_4H_9MgN(Si(CH_3)_3)_2$ or mixtures thereof.

21. The catalyst of claim 1 wherein said inorganic oxide or inorganic phosphate is pretreated to reduce surface hydroxyl content.

22. The catalyst of claim 21 wherein said inorganic oxide or inorganic phosphate is pretreated by calcining in an inert atmosphere.

23. The catalyst of claim 21 wherein said inorganic oxide or inorganic phosphate is pretreated with a hexa-alkyl disilazane.

24. The catalyst of claim 23 wherein said hexa-alkyl disilazane is hexamethyl disilazane.

25. The catalyst of claim 21 wherein said pretreated inorganic oxide or inorganic phosphate is modified with a modifying compound, wherein said modifying compound is $PCl_3$, $POCl_3$, $P(OCH_3)_3$, $P(OC_6H_5)_3$, $[(CH_3)_2N]POCl$, $(CH_3)_2PCl$, $CH_3PCl_2$, $F_2$, $HF$, $BF_3$, $SiF_4$, $SF_4$, $SOF_2$, $XeF_2$, $COF_2$, boron trifluoride etherate, disulfur decafluoride, iodine pentafluoride, diethylamino sulfur trifluoride, benzyl fluoride, ammonium hexafluorotitanate, ammonium hexafluorosilicate, ammonium fluoborate, magnesium fluoborate, a compound of the structure $(R_3Si)_2NH$, $R_3Si(OR)$, $R_3SiX$ or $(R_3Si)_2O$ wherein each R is independently an alkyl or aryl of 1 to 20 carbon atoms and X is halogen, $(OR^1)$, $—N(R_1)_2$, $—N(H)Si(R^1)_3$, $—OCH_2CH_2OR^1$ or $—O_2CR^1$ wherein each $R^1$ is independently alkyl or aryl of 1 to 20 carbon atoms or mixtures of said modifying compounds.

26. The catalyst of claim 1 wherein said inorganic oxide is silica, alumina or mixtures thereof and said inorganic phosphate is aluminum phosphate.

27. The catalyst of claim 1 wherein said zinc-containing composition is admixed in an amount of about 0.1 to about 3.0 millimoles per gram of inorganic oxide, inorganic phosphate or mixtures thereof.

28. The catalyst of claim 27 wherein said zinc-containing composition is admixed in an amount of about 0.5 to about 2.0 millimoles per gram of inorganic oxide, inorganic phosphate or mixtures thereof.

29. The catalyst of claim 1 wherein said vanadium-containing composition is admixed in an amount of about 0.01 to about 3.0 millimoles per gram of inorganic oxide, inorganic phosphate or mixtures thereof.

30. The catalyst of claim 29 wherein each of said zinc-containing composition and said vanadium-containing composition is admixed in an amount of about 1.0 millimole per gram of inorganic oxide, inorganic phosphate or mixtures thereof.

31. The catalyst of claim 2 wherein said auxiliary composition is admixed in an amount of about 0.1 to about 3.0 millimoles per gram of inorganic oxide, inorganic phosphate or mixtures thereof.

32. The catalyst of claim 31 wherein said auxiliary composition is admixed in an amount of about 1.0 millimole per gram of inorganic oxide, inorganic phosphate or mixtures thereof.

33. An olefin polymerization catalyst system comprising:
(i) the catalyst of claim 1; and
(ii) a co-catalyst.

34. The olefin polymerization catalyst system of claim 33 wherein said co-catalyst is a metal alkyl, metal alkyl hydride, metal alkyl halide, or metal alkyl alkoxide.

35. The olefin polymerization catalyst system of claim 34 wherein said metal is aluminum, boron, zinc, or magnesium.

36. The olefin polymerization catalyst system of claim 34 wherein said alkyl has 1 to about 12 carbon atoms.

37. The olefin polymerization catalyst system of claim 36 wherein said co-catalyst is triethyl aluminum, tri-isobutyl aluminum or mixtures thereof.

38. The olefin polymerization catalyst system of claim 33 further comprising a promotor having the structure

wherein $R^9$ is hydrogen or an unsubstituted or halogen substituted alkyl having 1 to about 6 carbon atoms, $X^5$ is halogen and f is 0, 1 or 2.

39. The olefin polymerization catalyst system of claim 38 wherein the promotor is $CCl_4$, $CH_2Cl_2$, $CBr_4$, $CH_3CCl_3$, $CF_2ClCCl_3$, $CHCl_3$, $CFCl_3$, $CFCl_2CCF_2Cl$, or mixtures thereof.

40. The olefin polymerization catalyst system of claim 33 wherein said co-catalyst is present in an amount that conforms to a molar ratio of co-catalyst to vanadium-containing composition of about 1:1 to about 200:1.

41. The olefin polymerization catalyst system of claim 38 wherein said promotor is present in an amount that conforms to a molar ratio of promotor to vanadium-containing composition of about 0.1:1 to about 200:1.

* * * * *

UNITED STATES PATENT AND TRADEMARK OFFICE
CERTIFICATE OF CORRECTION

PATENT NO. : 5,204,304

DATED : April 20, 1993

INVENTOR(S) : Kuo et al

Page 1 of 2

It is certified that error appears in the above-indentified patent and that said Letters Patent is hereby corrected as shown below:

Col. 2, line 37: "$VX_b^1(OR^2)_{a-b}$" should read -- $VX^1_b(OR^2)_{a-b}$ --.

Col. 2, line 67: "$MgR_e^6Y_{2-e}$" should read -- $MgR^6_eY_{2-e}$ --.

Col. 3, line 5: "$N(SiR_3^8)_2$" should read -- $N(SiR^8_3)_2$ --.

Col. 5, line 54: "$VX_b^1(OR^2)_{a-b}$" should read -- $VX^1_b(OR^2)_{a-b}$ --.

Col. 5, line 68: "$VOX_c^2(OR^3)_{3-c}$" should read -- $VOX^2_c(OR^3)_{3-c}$ --.

Col. 7, line 17: "$MgR_e^6Y_{2-e}$" should read -- $MgR^6_eY_{2-e}$ --.

Col. 8, line 24: "$R_f^9CX_{4-f}^5$" should read -- $R^9_fCX^5_{4-f}$ --.

Col. 11, line 64: "$ZnX_2 \cdot 2AlR_3^1$" should read -- $ZnX_2 \cdot 2AlR^1_3$ --.

Col. 12, line 5: "$VX_b^1(OR^2)_{a-b}$" should read -- $VX^1_b(OR^2)_{a-b}$ --.

Col. 12, line 24: "$M(R^4)_dX_{3-d}^3$" should read -- $M(R^4)_dX^3_{3-d}$ --.

Col. 12, line 27: "having to about 12 carbon atoms" should read -- having 1 to about 12 carbon atoms --.

Col. 12, line 35: "$MgR_e^6Y_{2-e}$" should read -- $MgR^6_eY_{2-e}$ --.

UNITED STATES PATENT AND TRADEMARK OFFICE
CERTIFICATE OF CORRECTION

PATENT NO. : 5,204,304
DATED : April 20, 1993
INVENTOR(S) : Kuo et al

It is certified that error appears in the above-indentified patent and that said Letters Patent is hereby corrected as shown below:

Col. 14, line 37: "$R_f^9 CX_{4-f}^5$" should read -- $R^9{}_f CX^5{}_{4-f}$ --.

Signed and Sealed this

Fifteenth Day of February, 1994

Attest:

BRUCE LEHMAN

Attesting Officer

Commissioner of Patents and Trademarks